(12) United States Patent
Yi et al.

(10) Patent No.: US 8,404,789 B2
(45) Date of Patent: Mar. 26, 2013

(54) OLEFIN POLYMERIZATION CATALYST AND PREPARATION METHOD AND USE THEREOF

(75) Inventors: Jianjun Yi, Beijing (CN); Chunming Cui, Tianjin (CN); Huashu Li, Tianjin (CN); Baozuo Yin, Tianjin (CN); Jianying Zhang, Tianjin (CN); Xiaomei Lang, Daqing (CN); Linmei Wu, Daqing (CN)

(73) Assignee: Petrochina Company Limited, Beijing (CN)

( * ) Notice: Subject to any disclaimer, the term of this patent is extended or adjusted under 35 U.S.C. 154(b) by 162 days.

(21) Appl. No.: 12/664,517

(22) PCT Filed: May 15, 2008

(86) PCT No.: PCT/CN2008/000943
§ 371 (c)(1),
(2), (4) Date: Mar. 1, 2010

(87) PCT Pub. No.: WO2008/151504
PCT Pub. Date: Dec. 18, 2008

(65) Prior Publication Data
US 2010/0184930 A1    Jul. 22, 2010

(30) Foreign Application Priority Data
Jun. 13, 2007 (CN) .......................... 2007 1 0118854

(51) Int. Cl.
*C08F 4/44* (2006.01)
(52) U.S. Cl. .................................... 526/123.1
(58) Field of Classification Search ................ 526/123.1
See application file for complete search history.

(56) References Cited

U.S. PATENT DOCUMENTS

| | | | | |
|---|---|---|---|---|
| 4,298,718 A | 11/1981 | Mayr et al. | .................... | 526/125 |
| 4,495,338 A | 1/1985 | Mayr et al. | .................... | 526/125 |

FOREIGN PATENT DOCUMENTS

| | | |
|---|---|---|
| CN | 90109183.9 | 5/1991 |
| CN | 1143651 A | 2/1997 |
| CN | 1034736 C | 4/1997 |
| CN | 1306544 A | 8/2001 |
| EP | 0361494 B1 | 2/1996 |
| GB | 2111066 A | 6/1983 |
| JP | 61287906 A | 12/1986 |
| JP | 61213209 A | 9/1996 |
| JP | 2001011486 A | 1/2001 |
| JP | 2003119211 A | 4/2003 |

OTHER PUBLICATIONS

English translation of JP 61-213209, 1986.*
International Search Report (Form PCT/ISA/210) dated Aug. 28, 2008 from PCT Application No. PCT/CN2008/000943, (6p).

* cited by examiner

*Primary Examiner* — Ling Choi
*Assistant Examiner* — Catherine S Branch
(74) *Attorney, Agent, or Firm* — Brinks Hofer Gilson & Lione

(57) ABSTRACT

An olefin polymerization catalyst and preparation method and use thereof are provided. The catalyst component comprises (1) an active magnesium halide, (2) a titanium compound containing at least one Ti-halide bond supported thereon, and (3) an electron donor selected from the group consisting of one or more sulfonyl-containing compounds having the following formula. There are two methods for preparing such solid catalyst component: I) treating the active magnesium halide (1) particles with alkylaluminum, subsequently adding the electron donor (3), treating it with the solution of titanium compound (2) one or more times; II) adding spherical magnesium chloride alcoholate particles to the solution of titanium compound (2), subsequently adding the electron donor (3), treating it with the solution of titanium compound (2) one or more times. The catalyst system comprises such solid catalyst component, a co-catalyst (alkylaluminum compound) and an external electron donor.

Formula (I)

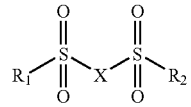

15 Claims, No Drawings

OLEFIN POLYMERIZATION CATALYST AND PREPARATION METHOD AND USE THEREOF

The present application is the national phase application of PCT Application No. PCT/CN2008/000943, filed May 15, 2008, which claims priority to Chinese Patent Application No. 200710118854.X, filed Jun. 13, 2007, the entireties of both of which are hereby incorporated by reference.

FIELD OF THE INVENTION

The present invention relates to olefin polymerization catalyst, preparation method and use thereof in catalyzing olefin polymerization.

BACKGROUND OF THE INVENTION

The development of high performance polyolefin resin depends on increasing improvement of the olefin polymerization catalyst. U.S. Pat. No. 4,298,718 and U.S. Pat. No. 4,495,338 relate to use active magnesium halide as a support of Ziegler-Natta catalyst for the first time, in which the catalyst formed by reaction of the support and titanium tetrachloride shows high activity in propylene polymerization, but has poor stereoselectivity. Subsequently, researchers are striving to improve the performance of the catalyst. GB Patent No. 2,111,066 discloses a high isotacticity polypropylene can be obtained by adding an electron donor (alkoxyl silicon compound) into a solid titanium catalyst during olefin polymerization, which is formed by contacting a liquid hydrocarbon solution of the magnesium compound with the titanium compound in the liquid state and meanwhile adding another electron donor (e.g. phthalate). EP Patent No. 0361,494 discloses a solid catalyst comprising active magnesium halide, titanium compound having at least one Ti-halide bond supported thereon and organic di- or poly-ether, such as the catalyst obtained by using a 1,3-diether as electron-donor compound. Under polymerization, such catalyst system can obtain high isotacticity polypropylene without adding external electron donor and having higher activity. Chinese Patent No. 1,143,651A further improves internal electron donor and/or external electron donor of such catalysts, in which 2-position carbon atoms of 1,3-diether are used to form a special monocyclic or polycyclic structure with organic groups containing two or three unsaturated bonds, namely, cyclic polyene-1,3-diether. The activity and stereoselectivity of such catalysts have been improved. Chinese Patent No. 1,306,544 describes that succinate is used as the internal electron donor to prepare a catalyst, which shows higher activity and stereoselectivity during catalyzing propylene polymerization and produces polypropylene with wider molecular weight distribution (MWD).

As stated in the above representative catalytic polymerization systems, electron donor has various effects on activity and stereoselectivity of the catalyst, and polymer performance, and has a crucial role to the tacticity of polypropylene. Therefore, the development of the polyolefin catalyst is to optimize the existing electron donors and develop novel electron donors. Most of the electron donors currently reported are compounds containing P, N and O, such as carboxylic ether, ether, organophosphine, amine, silicon compound, etc, which belong to several main categories of monoesters, diesters (including succinates, alcohol esters) and diethers, etc. It has been found during investigation that sulfonyl-containing compound used as the electron donor has special reactive performances with titanium compound and magnesium compound, and the resulting catalyst shows higher activity and stereoselectivity during catalyzing olefin polymerization.

SUMMARY OF THE INVENTION

The object of the present invention is to provide a solid catalyst for use in olefin polymerization, comprising (1) an active magnesium halide, (2) a titanium compound containing at least one Ti-halide bond supported thereon, and (3) an electron donor selected from a group consisting of one or more sulfonyl-containing compounds having the following formula (I).

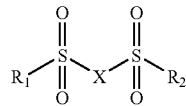

Formula (I)

Wherein X is selected from a group consisting of non-substituted or di-substituted elements of Group 14, non-substituted or mono-substituted elements of Group 15, or elements of Group 16, in which the substitutes are organic chain substitutes, mono-cycle, multi-cycle or heterocyclic groups, or aliphatic linear groups; $R_1$ and $R_2$ can be identical or different, selecting from a group consisting of hydrogen, halogen, alkyl, substituted alkyl, cyclo-alkyl, aryl, arylalkyl, alkylaryl, or heterocycle. A method for preparing such catalyst comprises reacting magnesium halide (1), or one precursor thereof with a titanium compound (2) and an electron donor compound (3), wherein the electron donor compound (3) is added before or during the reaction of magnesium halide with titanium compound or halogenated compound, and can be added for several times.

In particular, the said catalyst contains sulfonyl-containing compounds of formula (I), wherein X can be selected from a group consisting of $C(R_3)(R_4)$, $Si(R_3)(R_4)$, $Sn(R_3)(R_4)$, $Pb(R_3)(R_4)$, $N(R_5)$, $P(R_6)$, $As(R_6)$, O, S, Se or Te, wherein $R_3$ and $R_4$ can be identical or different, $R_3$, $R_4$, $R_5$ and $R_6$ can be selected from a group consisting of hydrogen, halogen, alkyl, substituted alkyl, cycloalkyl, aryl, arylalkyl, or alkylaryl, alkenyl, alkenyl-alkyl, alkynyl, heterocycle, or acyl, respectively; $R_3$ and $R_4$ also can form cycloalkyl or cycloalkenyl with C.

Preferably, the sulfonyl-containing compounds are disulfonyl alkane, disulfonyl alkene, disulfonyl cycloalkyl, disulfonyl silane, disulfonyl cyclosilane, disulfonyl dialkyl tin, disulfonyl dialkyl lead, and heteroatom-containing derivatives thereof; disulfonyl amines, disulfonyl phosphinidenes, disulfonyl arsenious, and heteroatom-containing derivatives thereof; (substituted) sulfonic acid anhydride, and sulfo- or seleno-derivatives thereof. Examples of the sulfonyl-containing compounds are as follows.

When X, in the formula (I) of the sulfonyl-containing compound, is $CR_3R_4$, both $R_1$ and $R_2$ are $CF_3$, the sulfonyl-containing compounds of the present invention preferably are:
di(trifluoromethylsulfonyl)methane;
[di(trifluoromethylsulfonyl)methyl]benzene;
1,1-di(trifluoromethylsulfonyl)-ethane;
[chloro-(trifluoromethylsulfonyl)-methylsulfonyl]-trifluoro-methane;
[bromo-(trifluoromethylsulfonyl)-methylsulfonyl]-trifluoro-methane;
dichloro-di-trifluoromethylsulfonyl-methane;
dibromo-di-trifluoromethylsulfonyl-methane;

chloro-bromo-di-trifluoromethylsulfonyl-methane;
2-[2,2-di-(trifluoromethylsulfonyl)-vinyl]-1H-pyrrole;
4-[2,2-di-(trifluoromethylsulfonyl)vinyl]-morpholine;
2-[2,2-di-(trifluoromethylsulfonyl)-vinyl]-1H-indole;
trifluoro-[methoxyl-(trifluoromethylsulfonyl)-methylsulfonyl]-methane;
1-chloro-1,1-di(trifluoromethylsulfonyl)-ethane;
1-bromo-1,1-di(trifluoromethylsulfonyl)-ethane;
4,4-di-(trifluoromethylsulfonyl)-1-butene;
3,3-di-(trifluoromethylsulfonyl)-1-propanol;
3,1-di-(trifluoromethylsulfonyl)-pentane;
4-bromo-4,4-di-(trifluoromethylsulfonyl)-1-butene;
3-bromo-5-chloro-1,1-di-(trifluoromethylsulfonyl)-pentane;
3-bromo-1,1-di-(trifluoromethylsulfonyl)-nonane;
[2,2-di-(trifluoromethylsulfonyl)]-ethylbenzene;
3-bromo-5,5-di-(trifluoromethylsulfonyl)-pentanoic acid;
4,1-di-(trifluoromethylsulfonyl)-propylene;
5,2-di-(trifluoromethylsulfonyl)-vinyl amine;
[2,2-di-(trifluoromethylsulfonyl)-vinyl]-dimethyl-amine;
[3,3-di-(trifluoromethylsulfonyl)-allyl]-benzene;
1-[2,2-di-(trifluoromethylsulfonyl)-vinyl]-naphthalene;
4-[2,2-di-(trifluoromethylsulfonyl)-vinyl]-2-ethoxy-phenol;
1-[2,2-di-(trifluoromethylsulfonyl)-vinyl]-4-nitro-benzene;
(2,2-di-(trifluoromethylsulfonyl)-vinyl-benzene;
7,7-di-(trifluoromethylsulfonyl)-bicyclic[4,1,0]-heptane;
1-[di-(trifluoromethylsulfonyl)-methyl]-4-methyl-benzene;
di-(trifluoromethylsulfonyl)-ketene;
1-[di-(trifluoromethylsulfonyl)-methylene]-pyrimidine;
[di-(trifluoromethylsulfonyl)-methylene]-triphenyl-$\lambda^5$-phosphorus;
1-[di-(trifluoromethylsulfonyl)-methyl]-4-fluoro-benzene;
difluoro-di-trifluoromethylsulfonyl-methane;
6,2-di-trifluoromethylsulfonyl-cyclopropane carboxylic acid ethyl ester;
trifluoro-(fluoro-trifluoromethylsulfonyl-sulfonylmethyl)-methane;
1-(di-trifluoromethylsulfonyl-methyl)-2,3,4,5,6-pentafluorobenzene;
{4-[2,2-di-(trifluoromethylsulfonyl)-vinyl]-phenyl}-diethylamine;
{4-[4,4-di-(trifluoromethylsulfonyl)-butyl-1,3-diethyl]-phenyl}-dimethylamine;
2-[2,2-di-(trifluoromethylsulfonyl)-ethyl]-malonic acid;
2-[2,2-di-(trifluoromethylsulfonyl)-ethyl]-3-oxo-ethyl butyrate;
2-[2,2-di-(trifluoromethylsulfonyl)-ethyl]-2-bromo-diethyl malonate;
1,1,3,3-tetra-(trifluoromethylsulfonyl)-propane;
1,1,2,2-tetra-(trifluoromethylsulfonyl)-ethane;
trifluoro-[methoxyl-(trifluoromethylsulfonyl)-mesyl]-methane;
[di-(trifluoromethylsulfonyl)-mesyl]-trifluoro-methane;
di-(trifluoromethylsulfonyl)-vinylketone;
4,2-di-(trifluoromethylsulfonyl)-ethyl malonate;
[(dimethyl-$\lambda^4$-sulfa-alkenyl)-(trifluoromethylsulfonyl)-mesyl]-trifluoromethane;
4,1-di-ethylsulfa-2,2-di-(trifluoromethylsulfonyl)-ethylene;
1-[di-(trifluoromethylsulfonyl)-methyl]-4-iodo-benzene;
1-[di-(trifluoromethylsulfonyl)-methyl]-4-fluoro-benzene;
N-[di-(trifluoromethylsulfonyl)-methylene]-N'-(4-nitro-benzene)-hydrazine;
5,2-di-(isopropyl amine)-1,1-(trifluoromethylsulfonyl)-ethylene;
1-(2,2-di-trifluoromethylsulfonyl-cyclopropyl)-ethyl ketone;
1-(2,2-di-trifluoromethylsulfonyl-vinyl)-4-methyl-benzene;
6,2-di-trifluoromethylsulfonyl-cyclopropyl carboxylic acid ethyl ester;
(1-p-tolyl-2,2-di-trifluoromethylsulfonyl-ethyl)-dimethyl phosphate;
1-(di-trifluoromethylsulfonyl-mesyl)-4-chloro-benzene;
(1-methyl-2,2-di-trifluoromethylsulfonyl-vinyl)-phenyl-amine;
1-(di-trifluoromethylsulfonyl-methyl)-4-tetra-butyl-2,3,5,6-tetrafluoro-benzene;
1-(di-trifluoromethylsulfonyl-methyl)-4-tetra-butyl-2,3,5,6-tetrafluoro-biphenyl;
trimethyl-(pentafluoro-di-trifluoromethylsulfonyl-methyl)-silane;
fluoro-tri-trifluoromethylsulfonyl-methane;
1-(di-trifluoromethylsulfonyl-methyl)-2,3,5,6-tetrafluoro-4-hexyloxy-benzene;

When X, in the formula (I) of the sulfonyl-containing compound, is $NR_5$, both $R_1$ and $R_2$ are $CF_3$, the sulfonyl-containing compounds of the present invention preferably are:

N-phenyl-di(trifluoromethylsulfonyl)amine (A);
N-2,6-diisopropylphenyl-di(trifluoromethylsulfonyl)amine (B);
N-(4-methoxyphenyl)-di(trifluoromethylsulfonyl)amine (C);
N-(3-chlorophenyl)-di(trifluoromethylsulfonyl)amine (D);
N-(2-fluorophenyl)-di(trifluoromethylsulfonyl)amine (E);
N-isobutyl-di(trifluoromethylsulfonyl)amine;
N-(2-methoxyethyl)-di(trifluoromethylsulfonyl)amine;
N-ethyl-di(trifluoromethylsulfonyl)amine;
N-benzyl-di(trifluoromethylsulfonyl)amine;
N-hexyl-di(trifluoromethylsulfonyl)amine;
N-(2-phenylethyl)-di(trifluoromethylsulfonyl)amine;
N-thienyl-di(trifluoromethylsulfonyl)amine;
N-cyclohexyl-di(trifluoromethylsulfonyl)amine;
N-(2-m-phenyl)-di(trifluoromethylsulfonyl)amine;
N-(3-fluorophenyl)-di(trifluoromethylsulfonyl)amine;
N-(4-fluorophenyl)-di(trifluoromethylsulfonyl)amine;
N-(3-methylphenyl)-di(trifluoromethylsulfonyl)amine;
N-(4-methylphenyl)-di(trifluoromethylsulfonyl)amine;
N-(4-carboxylphenyl)-di(trifluoromethylsulfonyl)amine;
N-(3-carboxylphenyl)-di(trifluoromethylsulfonyl)amine;
di(trifluoromethylsulfonyl)amine;
N-fluoro-di(trifluoromethylsulfonyl)amine;
N-(2-pyridyl)-di(trifluoromethylsulfonyl)amine;
N-(5-chloro-2-pyridyl)-di(trifluoromethylsulfonyl)amine;
N-trimethylsilyl-di(trifluoromethylsulfonyl)amine;
N-isopropyl-di(trifluoromethylsulfonyl)amine The structure formulas of several sulfonyl amine compounds of the present invention are provided:

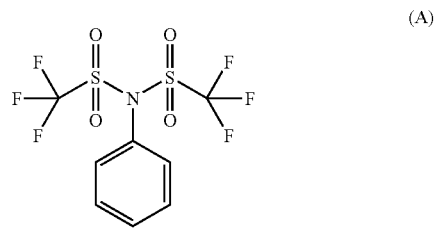

(A)

N-phenyl-di(trifluoromethylsulfonyl)amine

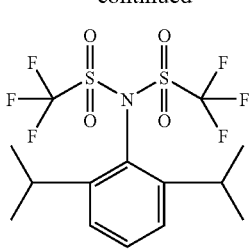

N-(2,6-diisopropylphenyl)-di(trifluoromethylsulfonyl)amine

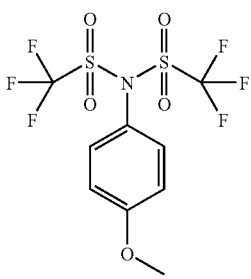

N-(4-methoxyphenyl)-di(trifluoromethylsulfonyl)amine

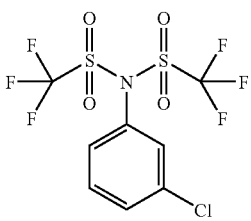

N-(3-chlorophenyl)-di(trifluoromethylsulfonyl)amine

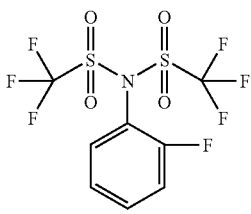

N-(2-fluorophenyl)-di(trifluoromethylsulfonyl)amine

The general synthetic methods for forming the sulfonyl amine compounds comprise the steps of:

dissolving organic amines and other alkaline substances in organic solvents, cooling to a low temperature to obtain a first mixture, adding sulfonic acid anhydride by droplet to the first mixture under stirring, reacting for 1 to 3 hours, and elevating naturally to room temperature; after stirring for 1 to 24 hours at room temperature to obtain a second mixture, diluting the second mixture, isolating the organic phase from the aqueous phase, and drying the organic phase. After filtering and isolating the organic phase, drying in vacuum to obtain white crystals. The yield is about 50%. The data of the following representative compounds are provided as follows by measuring H-NMR spectrograms with the solvent of $CDCl_3$:

(A) N-phenyl-di(trifluoromethylsulfonyl)amine:

| 7.42 ppm | multiplet | 2H aryl group |
|---|---|---|
| 7.57 ppm | multiplet | 3H aryl group |

(B) N-(2,6-diisopropylphenyl)-di(trifluoromethylsulfonyl)amine:

| 1.26 ppm | doublet | 12H $CH_3$ |
|---|---|---|
| 7.29 ppm | triplet | 2H aryl group |
| 7.50 ppm | multiplet | 1H aryl group |

(C) N-(4-methoxyphenyl)-di(trifluoromethylsulfonyl)amine:

| 3.86 ppm | triplet | 3H $CH_3$ |
|---|---|---|
| 6.98 ppm | multiplet | 2H aryl group |
| 7.30 ppm | multiplet | 2H aryl group |

(D) N-(3-chlorophenyl)-di(trifluoromethylsulfonyl)amine:

| 7.31 ppm | doublet | 1H aryl group |
|---|---|---|
| 7.41 ppm | doublet | 1H aryl group |
| 7.47 ppm | doublet | 1H aryl group |
| 7.57 ppm | doublet | 1H aryl group |

(E) N-(2-fluorophenyl)-di(trifluoromethylsulfonyl)amine: main peaks in mass spectrum:

| 486.8 | 485.8 | 378.4 | 355.5 | 314.2 | 243.6 | 161.3 | 130.4 | 102.3 |
|---|---|---|---|---|---|---|---|---|

Preferably, the sulfonyl-containing compound of the present invention, when X in the formula (I) of the sulfonyl-containing compound is $PR_6$, both $R_1$ and $R_2$ are $CF_3$. The compound is phosphine-phenyl-trifluoromethylsulfonyl phosphine. When X in the formula (I) of the sulfonyl-containing compound is O, both $R_1$ and $R_2$ are $CF_3$, the compound is trifluoromethylsulfonic anhydride.

The titanium compound (2) in the catalyst of the present invention is selected from a group consisting of titanium halide and titanium alcohol halide. Preferably, the compound is titanium tetrachloride. The precursor of the active magnesium halide (1) is selected from a group consisting of RMgX, $MgR_2$, $MgCl_2 \cdot mROH$, $Mg(OR)_2$, $X_nMg(OR)_{2-n}$, or the mixture of magnesium halide and titanium alcohol, wherein m is 1 to 3, 0<n<2, X is halogen, and R is $C_1$ to $C_{20}$ alkyl.

Another object of the present invention is to provide two methods for preparing olefin polymerization solid catalyst. The first method for preparing the catalyst comprises the steps of:

(i) dissolving or melting the active magnesium halide (1) formed by magnesium chloride precursor in a dispersant;
(ii) adding nonionic surface active agent to emulsify the above active magnesium halide in an organic liquid emulsifying medium, and dispersing the active magnesium halide for 0.5 to 3 hours under mechanical stirring of 1000 to 3500 rpm;
(iii) precipitating the active magnesium halide by adding precipitant, filtering and drying to obtain active magnesium halide solid particles;
(iv) treating the active magnesium halide solid particles with alkyl aluminum for 0.5 to 3 hours at 40-80° C. firstly, adding the electron donor (3) to obtain a first mixture, then treating the first mixture with an organic solution of titanium compound (2) for several times to obtain a second mixture, and filtering, washing and drying the second mixture to obtain a solid catalyst.

In the first method, the active magnesium halide (1) in step (i) comprises solid particle of magnesium halide alcoholate, such as $MgCl_2·X(n-BuOH)$ (wherein $0.1<X<2$) disclosed in CN90109183.9, of which the specific surface area is 1-20 $m^2/g$, and porosity is 1-2 $cm^2/g$, and in which the support consists of solid particles having an average particle diameter in micrometers, and particle size distribution (D90/D10) is less than or equal to 7 (D90 and D10 are the diameters of the particles corresponding to 90% and 10% of a particle size cumulative distribution on a weight basis, respectively, from large to small). The dispersant in step (i) is an alkane having a boiling point of less than 150° C., such as hexane, heptane, etc. The nonionic surface active agent in step (ii) is selected from a group consisting of the surface active agents having a hydrophile-lipophile balance value (HLB) of 0-9, preferably 1-4, such as sorbitan trioleate. The organic liquid emulsifying medium in step (ii) is preferably selected from a group consisting of heavy hydrocarbons, such as paraffin oil having a viscosity of 0.1-1 Pa·s at 20° C. The precipitant in step (iii) is a silicon chloride derivative having a formula of $SiClXR_{4-X}$ (wherein $1<X\leq4$, R is saturated hydrocarbon containing 1-4 carbon atoms), such as derivatives of $SiCl_4$. The organic solvent used to the titanium compound (2) in step (iv) is halogenated hydrocarbon, such as 1,2-dichloroethane. The organic solution of titanium compound (2) has a concentration of 0.1-10 mol/L, preferably 1M, and can be used to treat with the support for several times, in which at least one treating temperature is within −40 to 0° C., preferably −30 to 0° C., another is within 70 to 100° C., preferably 80 to 90° C. The mole ratio of Ti/Mg is about 1-100, preferably 1-10. The internal electron donor in step (iv) is a sulfonyl-containing compound (3), such as trifluoromethylsulfonic acid anhydride, N-phenyl-di(trifluoromethylsulfonyl)amine; N-(2,6-diisopropylphenyl)-di(trifluoromethylsulfonyl)amine; N-(4-methoxy phenyl)-di(trifluoromethylsulfonyl)amine; N-(3-chlorophenyl)-di(trifluoromethyl sulfonyl)amine; N-(2-fluorophenyl)-di(trifluoromethylsulfonyl)amine. The mole ratio of the internal electron donor to Mg is 0.1-2, preferably 0.5-1. The sulfonyl-containing compound (3) can be added in one or more times directly or in the manner of solution.

The second method for preparing the catalyst of the present invention comprises the steps of:
(i) adding spherical magnesium chloride alcoholate particles to the solution of titanium tetrachloride and reacting for 0.1 to 3 hours at a temperature of −40 to 0° C. to provide a first mixture;
(ii) elevating the temperature to 40 to 100° C. gradually, adding an internal electron donor to the first mixture and reacting for 0.5 to 3 hours to obtain a second mixture;
(iii) adding titanium compound (2) to the second mixture at temperature of 80 to 140° C., reacting for 0.5 to 3 hours to obtain a resulting mixture and filtering the resulting mixture, optionally repeating this step for 1 to 3 times;
(iv) washing and drying the resulting mixture to obtain a spherical solid catalyst.

In the second method, the spherical magnesium chloride alcoholate in step (i) has a formula of $Mg(OR^1)X_{2-m}·n(R^2OH)$, wherein n is an integer or fraction of $0<n<4$, which is disclosed in CN1034736C. The spherical magnesium chloride alcoholate can be treated with titanium compound (2) for several times, in which at least one treating temperature is within −40 to 0° C., preferably −30 to 0° C., another is within 80 to 140° C., preferably 90 to 130° C., and the titanium compound has a total amount of 1-200 at the mole ratio of Ti/Mg, preferably 1-100. The electron donor in step (ii) is the same with the first method.

Yet another object of the present invention is to provide a solid catalyst system for use in olefin polymerization, comprising the solid catalyst synthesized by the above two methods, co-catalyst and an external electron donor, wherein the co-catalyst is alkyl aluminum compound having a formula of $AlR_nX_{(3-n)}$, in which R is alkyl containing 1-20 carbon atoms, arylalkyl, aryl; X is halogen, and n is an integer within $0<n<3$. Preferably, the aluminum compound is selected from a group consisting of trimethyl aluminum, triethyl aluminum, triisobutyl aluminum, trioctyl aluminum, monohydrogen diethyl aluminum, monohydrogen diisobutyl aluminum, aluminum diethyl monochloride (DEAC), diisobutyl aluminum monochloride and ethyl aluminum dichloride, and combinations thereof. The external electron donor is selected from a group consisting of siloxane compound having a formula of $R_nSi(OR_1)_{4-n}$, wherein R is $C_1$-$C_{10}$ alkyl, cycloalkyl and aryl; $R_1$ is alkyl having 1-4 carbon atoms; and n is an integer within $0<n<3$, such as phenyl trimethoxysilane (PTMS), phenyl triethoxysilane (PTES) and diphenyl dimethoxy silane (DPDMS), preferably phenyl triethoxysilane and diphenyl dimethoxy silane.

When the solid catalyst system provided by the present invention is used in olefin polymerization, the mole ratio of titanium in the solid catalyst to aluminum in the co-catalyst is 1:1 to 1:2000, preferably 1:10 to 1:500; the mole ratio of silicon in the external electron donor to titanium in solid catalyst is 1-100, preferably 1-50. The polymerization process can be slurry method, bulk method, or gas phase method with polymerization temperature of 20-100° C., preferably 40-90° C.

DETAILED DESCRIPTION OF THE PREFERRED EMBODIMENTS

The present invention will be illustrated by the examples hereinafter, but not limited to those.

The catalysts in the examples are operated with Schlenk instruments under the protection of high-purity nitrogen. The examples are as follows.

EXAMPLE 1

45 mL anhydrous hexane, 15 g anhydrous $MgCl_2$ and 144 mL anhydrous n-butanol are added to a 250 mL three-neck flask in sequence. Hexane is evaporated, and then the temperature is decreased to ambient temperature (around 10° C.) to obtain a homogeneous, colorless and transparent solution. The resulting $MgCl_2$ in n-butanol solution is added into a 500 mL three-neck flask containing 100 mL paraffin oil and 0.32 g sorbitan trioleate under agitating for 30 minutes at 1000 rpm to obtain a stable white emulsion. The temperature is maintained at around 35° C., 26 mL of 5 M $SiCl_4$ in hexane solution is added slowly dropwise over 40 minutes, and then the mixture is heated to 50° C. for one hour to obtain a first mixture. The first mixture is cooled, settled. The upper paraffin oil of the first mixture is filtered to obtain a second mixture. The second mixture is washed with about 100 mL anhydrous hexane for three times, and dried to provide 6.3 g magnesium chloride alcoholate support.

1.3 g of the solid alcoholate support and 30 mL anhydrous heptane, and then 0.65 mL triethylaluminum are added to a 250 mL three-neck flask to obtain a first mixture. The first mixture is heated to 50° C. for one hour. The first mixture is filtered, washed with heptanes to obtain a white solid. The obtained white solid is treated with 3.8 mmol of an internal electron donor trifluoromethylsulfonic anhydride at 0.3 M in heptane at 90° C. for 2 hours to obtain a second mixture. The second mixture is filtered, washed with heptane. The second mixture is kept for 20 minutes after adding 20 mL of 1 M $TiCl_4$-1,2-dichloroethane solution dropwise at −30° C., and then kept at 80° C. for 1 hour. The upper clear solution of the second mixture is filtered. The second mixture is kept 80° C. for 1 hour after adding 20 mL of 1 M $TiCl_4$-1,2-dichloroethane solution dropwise. Then the second mixture is washed, dried, and dried to obtain 0.43 g solid catalyst. The titanium has a percentage of 2.28%.

The air of a 250 mL dry three-neck flask is replaced sufficiently with nitrogen, then replaced sufficiently with propylene. The pressure of the system is slightly higher than $1.1013 \times 10^5$ Pa. 100 mL heptane is added into the flask, and heated to around 50° C. A certain amount of $AlEt_3$ and the catalyst are added at a constant temperature. The temperature is maintained for 1 hour. 100 mL hydrochloric acid-ethanol solution (5% of hydrochloric acid) is used to stop the reaction to obtain a polymer. The polymer is washed with anhydrous ethanol and dried in vacuum to obtain 6.27 g polypropylene. The activity of the catalyst is 14929 g polymer/g (Ti) $h^{-1}$, the isotacticity is 92%, which is measured by extracting the polymer with boiling heptane for 6 hours.

EXAMPLE 2

Similar to example 1, the difference is that N-methoxyphenyl-di(trifluoromethyl sulfonyl)amine is used as the electron donor to obtain 0.65 g solid catalyst, in which the titanium has a percentage of 3.86%. The activity of the catalyst is 5518 g polymer/g (Ti)$h^{-1}$, and the isotacticity is 93%.

EXAMPLE 3

Similar to example 1, the difference is that N-phenyl-di(trifluoromethylsulfonyl)amine is used as the electron donor to obtain 0.49 g solid catalyst, and the titanium has a percentage of 3.95%. The activity of the catalyst is 11797 g polymer/g (Ti) $h^{-1}$, and the isotacticity is 90%.

EXAMPLE 4

Similar to example 1, the difference is that N-(2,6-diisopropylphenyl)-di(trifluoro methylsulfonyl)amine is used as the electron donor to obtain 0.43 g solid catalyst, and the titanium has a percentage of 3.94%. The activity of the catalyst is 14645 g polymer/g (Ti) $h^{-1}$, and the isotacticity is 91%.

EXAMPLE 5

Similar to example 1, the difference is that N-m-chlorophenyl-di(trifluoro methylsulfonyl)amine is used as the electron donor to obtain 0.51 g solid catalyst, and the titanium content has a percentage of 3.72%. The activity of the catalyst is 31371 g polymer/g (Ti) $h^{-1}$, and the isotacticity is 90%.

EXAMPLE 6

Similar to example 2, the difference is that phenyl trimethoxysilane is used as the external electron donor during propylene polymerization. The activity of the catalyst is 2462 g polymer/g (Ti) $h^{-1}$, and the isotacticity is 98%.

EXAMPLE 7

Similar to example 3, the difference is that phenyl trimethoxysilane is used as the external electron donor during propylene polymerization. The activity of the catalyst is 11494 g polymer/g (Ti) $h^{-1}$, and the isotacticity is 92%.

EXAMPLE 8

Similar to example 4, the difference is that phenyl trimethoxysilane is used as the external electron donor during propylene polymerization. The activity of the catalyst is 3858 g polymer/g (Ti) $h^{-1}$, and the isotacticity is 97%.

EXAMPLE 9

2.0 g spherical $MgCl_2.2.85C_2H_5OH$ support is slowly added to a reaction flask filled with 56 mL $TiCl_4$ at −25° C. Then the mixture is heated gradually to 80° C. And then 2 mmol of internal electron donor N-m-chlorophenyl-di(trifluoromethylsulfonyl)amine is added into the flask. The temperature is kept for 30 minutes, and then heated to 130° C. for reacting 2 hours to obtain a first mixture. The first mixture is filtered, in which 30 mL $TiCl_4$ is added to react for 2 hours at 130° C. to obtain a second mixture. The second mixture is washed for 6 times with n-hexene, and dried in vacuum to obtain 1.1 g catalyst, and the titanium has a percentage of 2.93%.

The air of a 250 mL dry three-neck flask is replaced sufficiently with nitrogen, then replaced sufficiently with propylene under the pressure of the system slightly higher than $1.1013 \times 10^5$ Pa. 100 mL heptane is added into the flask, heated to around 50° C. A certain amount of $AlEt_3$ and the catalyst are added at a constant temperature with keeping the temperature for 1 hour. 100 mL hydrochloric acid-ethanol solution (5% of hydrochloric acid) is used to make the reaction stop to obtain a polymer. The polymer is washed with anhydrous ethanol and dried in vacuum to obtain 6.27 g polypropylene. The activity of the catalyst is 6143 g polymer/g (Ti) $h^{-1}$, and the isotacticity is 97%.

EXAMPLE 10

Similar to example 9, the difference is that 1 mmol N-m-chlorophenyl-di(trifluoromethylsulfonyl)amine is used as the electron donor to obtain 1.0 g spherical catalyst, and the titanium has a percentage of 3.29%. The activity of the catalyst is 10000 g polymer/g (Ti) $h^{-1}$, and the isotacticity is 94%.

EXAMPLE 11

Similar to example 9, the difference is that 0.5 mmol N-m-chlorophenyl-di(trifluoromethylsulfonyl)amine is used as the internal electron donor to obtain 1.1 g spherical catalyst, and the titanium has a percentage of 2.98%. The activity of the catalyst is 7114 g polymer/g (Ti) $h^{-1}$, and the isotacticity is 93%.

EXAMPLE 12

Similar to example 9, the difference is that 1.5 mmol N-m-chlorophenyl-di(trifluoromethylsulfonyl)amine is used as the internal electron donor to obtain 1.2 g spherical catalyst, and the titanium has a percentage of 2.57%. The activity of the catalyst is 5019 g polymer/g (Ti) $h^{-1}$, and the isotacticity is 96%.

EXAMPLE 13

1.2 g spherical catalyst having titanium amount of 2.81% is obtained by adding 1.5 mmol N-m-chlorophenyl-di(trifluoromethylsulfonyl)amine as the internal electron donor. The bulk polymerization is 3 L: in a stainless steel reaction boiler, 10.8 mg solid catalyst, 2.5 mL of 1.0 M triethyl aluminum, 2.5 mL of 0.1M diphenyl dimethoxy silane, are added under the hydrogen partial pressure of 0.2 MPa at a reaction temperature of 70° C. for 1 hour. The catalyst has an activity of $1.138 \times 10^6$ g polymer/g (Ti) $h^{-1}$, an isotacticity of 99%, and melt index of 3.11 g/10 min.

EXAMPLE 14

Similar to example 13, the difference is that the partial pressure of hydrogen is 1.0 MPa. The catalyst has an activity of $1.236 \times 10^6$ g polymer/g (Ti) $h^{-1}$, an isotacticity of 98%, and melt index of 18.41 g/10 min.

EXAMPLE 15

Similar to example 13, the difference is that N-methoxyphenyl-di(trifluoromethylsulfonyl)amine is used as the electron donor. The catalyst has an activity of $1.013 \times 10^6$ g polymer/g (Ti) $h^{-1}$, an isotacticity of 98%.

COMPARATIVE EXAMPLE 1

Similar to example 1, the difference is that 1.4 g solid catalyst is obtained by adding 2.4 mL dioctylphthalate (DOP), 2 g magnesium chloride alcoholate support. The catalyst has an activity of 301 g polymer/g (Ti) $h^{-1}$, an isotacticity of 72%.

COMPARATIVE EXAMPLE 2

Similar to example 9, the difference is that 0.54 mL dioctylphthalate (DOP) is added. The catalyst has an activity of 58 g polymer/g (Ti) $h^{-1}$, an isotacticity of 98%.

COMPARATIVE EXAMPLE 3

Similar to comparative example 2, the difference is that polymerization method is bulk polymerization (similar to example 13). The catalyst has an activity of 19 g polymer/g (Ti) $h^{-1}$, an isotacticity of 97.6%.

Industrial Applications

The solid catalyst of the present invention has extremely high activity in propylene polymerization. For example, the catalyst, in which N-m-chlorophenyl-di(trifluoro methylsulfonyl)amine is used as the internal electron donor and no external electron donor is used, has an activity of 31371 g polymer/g (Ti) $h^{-1}$ (50° C., 1 hour, normal pressure slurry polymerization). Such catalyst has extremely high activity, therefore, the residual amounts of the catalyst and co-catalyst in the prepared polymer are reduced greatly, and various performances of the polymer product are much better. When the catalyst is applied to the stereotactic polymerization of propylene, the polymer has higher isotacticity. For example, when using the catalyst, in which N-methoxyphenyl-di(trifluoromethylsulfonyl)amine is used as the internal electron donor and phenyl trimethoxysilane as the external electron donor during normal pressure polymerization, the isotacticity of the polypropylene is 98%. If external electron donor compounds commonly used in the industry such as diphenyl dimethoxy silane, are used, the bulk polymerization has an activity as high as 50 kg polymer/g (catalyst) $h^{-1}$, a good hydrogen response, and isotacticity of up to 99%, and thereby strong industrial applicability can be achieved. Another feature of the catalyst system of the present invention is that the catalyst of the present invention has better copolymerization of propylene and ethylene than that of the traditional electron donor catalyst. The catalyst of the present invention is more suitable for producing copolymerization products of random, block and etc.

What is claimed is:

1. An olefin polymerization catalyst, comprising (1) an active magnesium halide, (2) a titanium compound having at least one Ti-halide bond, and (3) an electron donor selected from a group consisting of sulfonyl-containing compounds having the following formula:

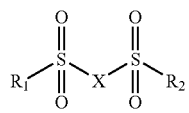

wherein X is one element selected from the group consisting of non-substituted or di-substituted elements of Group 14, non-substituted or mono-substituted elements of Group 15, and elements of Group 16; wherein the substituent groups are alkyl, alkynyl, mono-cycle, multi-cycle, or heterocycle groups; wherein $R_1$ and $R_2$ are independently selected from the group consisting of hydrogen, halogen, alkyl, substituted alkyl, cyclo-alkyl, aryl, arylalkyl, alkylaryl, and heterocycle.

2. An olefin polymerization catalyst, comprising an active magnesium halide, a titanium compound having at least one Ti-halide bond, and an electron donor selected from the group consisting of sulfonyl-containing compounds having the following formula:

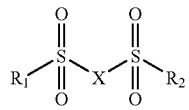

wherein X is selected from the group consisting of $C(R_3)(R_4)$, $Si(R_3)(R_4)$, $Sn(R_3)(R_4)$, $Pb(R_3)(R_4)$, $N(R_5)$, $P(R_6)$, $As(R_6)$, O, S, Se, and Te; wherein $R_1$ and $R_2$ are independently selected from the group consisting of hydrogen, halogen, alkyl, substituted alkyl, cyclo-alkyl, aryl, arylalkyl, alkylaryl, and heterocycle; wherein $R_3$ and $R_4$ can be identical or different, $R_3$, $R_4$, $R_5$ and $R_6$ are independently selected from the group consisting of hydrogen atom, halogen, alkyl, substituted alkyl, cycloalkyl, aryl, arylalkyl, alkylaryl, alkenyl, alkenyl-alkyl, alkynyl, heterocycle, and acyl; $R_3$ and $R_4$ may form cycloalkyl or cycloalkenyl with C.

3. An olefin polymerization catalyst, comprising an active magnesium halide, a titanium compound having at least one Ti-halide bond, and a sulfonyl-containing compound;

wherein the sulfonyl-containing compound is selected from the group consisting of disulfonyl alkane, disulfonyl alkene, disulfonyl cycloalkyl, disulfonyl silane, disulfonyl cyclosilane, disulfonyl dialkyl tin, disulfonyl dialkyl lead, disulfonyl amines, disulfonyl phosphinidenes, disulfonyl arsenious, and heteroatom-containing derivatives thereof; and sulfonic acid anhydride, substituted sulfonic acid anhydride, and sulfo- or seleno-derivatives thereof.

4. An olefin polymerization catalyst, comprising an active magnesium halide, a titanium compound having at least one Ti-halide bond, and a sulfonyl-containing compound, wherein the sulfonyl-containing compound is selected from the group consisting of:

di(trifluoromethylsulfonyl)methane;
[di(trifluoromethylsulfonyl)methyl]benzene;
1,1-di(trifluoromethylsulfonyl)-ethane;
[chloro-(trifluoromethylsulfonyl)-methylsulfonyl]-trifluro-methane;
[bromo-(trifluoromethylsulfonyl)-methylsulfonyl]-trifluro-methane;
dichloro-di-trifluoromethylsulfonyl-methane;
dibromo-di-trifluoromethylsulfonyl-methane;
2-[2,2-di-(trifluoromethylsulfonyl)-vinyl]-1H-pyrrole;
4-[2,2-di-(trifluoromethylsulfonyl)vinyl]-morpholine;
2-[2,2-di-(trifluoromethylsulfonyl)-vinyl]-1H-indole;
trifluro-[methoxyl-(trifluoromethylsulfonyl)-methylsulfonyl]-methane;
1-chloro-1,1-di(trifluoromethylsulfonyl)-ethane;
1-bromo-1,1-di(trifluoromethylsulfonyl)-ethane;
4,4-di-(trifluoromethylsulfonyl)-1-butene;
2,3-di-(trifluoromethylsulfonyl)-1-propanol;
1,1-di-(trifluoromethylsulfonyl)-pentane;
4-bromo-4,4-di-(trifluoromethylsulfonyl)-1-butene;
3-bromo-5-chloro-1,1-di-(trifluoromethylsulfonyl)-pentane;
3-bromo-1,1-di-(trifluoromethylsulfonyl)-nonane;
[2,2-di-(trifluoromethylsulfonyl)]-ethylbenzene;
3-bromo-5,5-di-(trifluoromethylsulfonyl)-pentanoic acid;
1,1-di-(trifluoromethylsulfonyl)-propylene;
2,2-di-(trifluoromethylsulfonyl)-vinyl amine;
[2,2-di-(trifluoromethylsulfonyl)-vinyl]-dimethylamine;
[3,3-di-(trifluoromethylsulfonyl)-ally]-benzene;
1-[2,2-di-(trifluoromethylsulfonyl)-ethyl]-naphthalene;
4-[2,2-di-(trifluoromethylsulfonyl)-ethyl]-2-ethoxy-phenol;
1-[2,2-di-(trifluoromethylsulfonyl)-ethyl]-4-nitro-benzene;
(2,2-di-trifluoromethylsulfonyl-vinyl-benzene;
7,7-di-(trifluoromethylsulfonyl)-bicyclic[4,1,0]-heptane;
1-[di-(trifluoromethylsulfonyl)-methyl]-4-methyl-benzene;
di-(trifluoromethylsulfonyl)-ketene;
1-[di-(trifluoromethylsulfonyl)-methylene]-pyrimidine;
[di-(trifluoromethylsulfonyl)-methylene]-triphenyl-λ5-phosphorus;
1-[di-(trifluoromethylsulfonyl)-methyl]-4-fluoro-benzene;
difluoro-di-trifluoromethylsulfonyl-methane;
3,2-di-trifluoromethylsulfonyl-cyclopropane carboxylic acid ethyl ester;
trifluoro-(fluoro-trifluoromethylsulfonyl-sulfonylmethyl)-methane;
1-(di-trifluoromethylsulfonyl-methyl)-2,3,4,5,6-pentafluorophenyl;
{4-[2,2-di-(trifluoromethylsulfonyl)-vinyl]-phenyl}-diethylamine;
{4-[4,4-di-(trifluoromethylsulfonyl)-butyl-1,3-diethyl]-phenyl}-dimethylamine;
2-[2,2-di-(trifluoromethylsulfonyl)-ethyl]-malonic acid;
2-[2,2-di-(trifluoronnethylsulfonyl)-ethyl]-3-oxo-ethyl butyrate;
2-[2,2-di-(trifluoromethylsulfonyl)-ethyl]-2-bromo-diethyl malonate;
1,1,3,3-tetra-(trifluoromethylsulfonyl)-propane;
1,1,2,2-tetra-(trifluoromethylsulfonyl)-ethane;
trifluoro-[methoxyl-(trifluoromethylsulfonyl)-mesyl]-methane;
[di-(trifluoromethylsulfonyl)-mesyl]-trifluoro-methane;
di-(trifluoromethylsulfonyl)-ethyl ketone;
2,2-di-(trifluoromethylsulfonyl)-ethyl malonate;
[(dimethyl-λ4-sulfa-alkenyl)-(trifluoromethylsulfonyl)-mesyl]-trifluoro-methane;
1,1-di-ethylsulfa-2,2-di-(trifluoromethylsulfonyl)-ethylene;
1-[di-(trifluoromethylsulfonyl)-methyl]-4-iodo-benzene;
1-[di-(trifluoromethylsulfonyl)-methyl]-4-fluoro-benzene;
N-[di-(trifluoromethylsulfonyl)-methylene]-N'-(4-nitrobenzene)-hydrazine;
2,2-di-(isopropyl amine)-1,1-(trifluoromethylsulfonyl)-ethylene;
1-(2,2-di-trifluoromethylsulfonyl-cyclopropyl)-ketone;
1-(2,2-di-trifluoromethylsulfonyl-vinyl)-4-methyl-benzene;
3,2-di-trifluoromethylsulfonyl-cyclopropyl carboxylic acid ethyl ester;
(1-p-tolyl-2,2-di-trifluoromethylsulfonyl-ethyl)-dimethyl phosphate;
1-(di-trifluoromethylsulfonyl-mesyl)-4-chloro-benzene;
(1-methyl-2,2-di-trifluoromethylsulfonyl-vinyl)-phenyl-amine;
1-(di-trifluoromethylsulfonyl-methyl)-4-tetra-butyl-2,3,5,6-tetrafluoro-benzene;
1-(di-trifluoromethylsulfonyl-methyl)-4-tetra-butyl-2,3,5,6-tetrafluoro-biphenyl;
trimethyl-(pentafluoro-di-trifluoromethylsulfonyl-methyl)-silane;
fluoro-tri-trifluoromethylsulfonyl-methane;
1-(di-trifluoromethylsulfonyl-methyl)-2,3,5,6-tetrafluoro-4-hexyloxy-benzene;
N-phenyl-di(trifluoromethylsulfonyl)amine;
N-2,6-diisopropylphenyl-di(trifluoromethylsulfonyl)amine;
N-(4-methoxyphenyl)-di(trifluoromethylsulfonyl)amine;
N-(3-chlorophenyl)-di(trifluoromethylsulfonyl)amine;
N-(2-fluorophenyl)-di(trifluoromethylsulfonyl)amine;
N-isobutyl-di(trifluoromethylsulfonyl)amine;
N-(2-methoxyethyl)-di(trifluoromethylsulfonyl)amine;
N-ethyl-di(trifluoromethylsulfonyl)amine;
N-benzyl-di(trifluoromethylsulfonyl)amine;
N-hexyl-di(trifluoromethylsulfonyl)amine;
N-(2-phenylethyl)-di(trifluoromethylsulfonyl)amine;
N-thienyl-di(trifluoromethylsulfonyl)amine;
N-cyclohexyl-di(trifluoromethylsulfonyl)amine;
N-(2-m-phenyl)-di(trifluoromethylsulfonyl)amine;
N-(4-fluorophenyl)-di(trifluoromethylsulfonyl)amine;
N-(3-methylphenyl)-di(trifluoromethylsulfonyl)amine;
N-(4-methylphenyl)-di(trifluoromethylsulfonyl)amine;
N-(4-carboxylphenyl)-di(trifluoromethylsulfonyl)amine;
N-(3-carboxylphenyl)-di(trifluoromethylsulfonyl)amine;
di(trifluoromethylsulfonyl)amine;
N-fluoro-di(trifluoromethylsulfonyl)amine;
N-(2-pyridyl)-di(trifluoromethylsulfonyl)amine;
N-(5-chloro-2-pyridyl)-di(trifluoromethylsulfonyl)amine;
N-trimethylsilyl-di(trifluoromethylsulfonyl)amine;
N-isopropyl-di(trifluoromethylsulfonyl)amine;
phosphine-phenyl-di(trifluoromethylsulfonyl)phosphinidene; and
trifluoromethylsulfonic acid anhydride.

5. The olefin polymerization catalyst of claim 1, wherein the titanium compound is selected from a group consisting of titanium halide and titanium alcohol halide.

6. The olefin polymerization catalyst of claim 1, wherein the titanium compound is titanium tetrachloride.

7. An olefin polymerization catalyst, comprising an active magnesium halide, a titanium compound having at least one Ti-halide bond, and an electron donor selected from the group consisting of sulfonyl-containing compounds having the following formula:

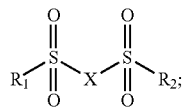

wherein X is one atom selected from the group consisting of non-substituted or di-substituted elements of Group 14, non-substituted or mono-substituted elements of Group 15, and elements of Group 16; wherein the substituent groups are alkyl, alkynyl, mono-cycle, multi-cycle, or heterocycle groups; wherein $R_1$ and $R_2$ are independently selected from the group consisting of hydrogen, halogen, alkyl, substituted alkyl, cyclo-alkyl, aryl, arylalkyl, alkylaryl, and heterocycle; and wherein the active magnesium halide is formed from a precursor; and wherein the precursor of the active magnesium halide is selected from the group consisting of RMgX', $Mg(R)_2$, $MgCl_2 \cdot mROH$, $Mg(OR)_2$, $X'nMg(OR)_{2-n}$, and a mixture of magnesium halide and titanium alcohol, wherein m is 1 to 3, $0<n<2$, X' is halogen, and R is C1 to C20 alkyl.

8. A catalyst system for catalyzing olefin polymerization comprising:
an olefin polymerization catalyst, comprising:
a magnesium halide;
a titanium compound having at least one Ti-halide bond; and
a first electron donor having the following formula:

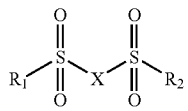

wherein X is one atom selected from a group consisting of non-substituted or di-substituted elements of Group 14, non-substituted or mono-substituted elements of Group 15, and elements of Group 16; wherein the substituent groups are alkyl, alkynyl, mono-cycle, multi-cycle, or heterocycle groups; wherein $R_1$ and $R_2$ are independently selected from a group consisting of hydrogen, halogen, alkyl, substituted alkyl, cyclo-alkyl, aryl, arylalkyl, alkylaryl, and heterocycle;

a co-catalyst; and a second electron donor.

9. The catalyst system of claim 8, wherein the co-catalyst is an alkyl aluminum compound having a formula of $AlRnX(3-n)$, wherein R is selected from a group consisting of C1-C20 alkyl, arylalkyl, and aryl; and wherein X is halogen, and $0 \leq n \leq 3$.

10. The catalyst system of claim 9, wherein the co-catalyst is selected from a group consisting of trimethyl aluminum, triethyl aluminum, triisobutyl aluminum, trioctyl aluminum, monohydrogen diethyl aluminum, monohydrogen diisobutyl aluminum, aluminum diethyul monochloride, diisobutyl aluminum chloride, and ethylaluminum dichloride.

11. The catalyst system of claim 9, wherein the mole ratio of titanium to aluminum is about 1:1 to about 1:2000.

12. The catalyst system of claim 8, wherein the second electron donor has a formula of $RnSi(OR_1)(4-n)$, wherein R is C1-C10 alkyl, cycloalkyl, and aryl; $R_1$ is C1-C4 alkyl; and $0 \leq n \leq 3$.

13. The catalyst system of claim 12, wherein the mole ratio of silicon of the second electron donor to titanium is about 1 to about 100.

14. The catalyst system of claim 12, wherein the second electron donor is selected from a group consisting of phenyl trimethoxysilane, phenyl triethoxysilane, and diphenyl dimethoxy silane.

15. A method for polymerizing olefin, comprising polymerizing olefin in the presence of the catalyst system of claim 8.

* * * * *

UNITED STATES PATENT AND TRADEMARK OFFICE
CERTIFICATE OF CORRECTION

PATENT NO. : 8,404,789 B2  Page 1 of 1
APPLICATION NO. : 12/664517
DATED : March 26, 2013
INVENTOR(S) : Yi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 238 days.

Signed and Sealed this
First Day of September, 2015

Michelle K. Lee
*Director of the United States Patent and Trademark Office*